May 5, 1959     L. R. BOBNAR     2,884,864
PRESSURE LOADED PUMP, TRAPPING GROOVES
Filed April 14, 1955     2 Sheets-Sheet 1

Inventor:
Louis R. Bobnar
By: Joseph R. Dwyer
Atty.

United States Patent Office 2,884,864
Patented May 5, 1959

2,884,864

PRESSURE LOADED PUMP, TRAPPING GROOVES

Louis R. Bobnar, Solon, Ohio, assignor to Borg-Warner Corporation, Chicago, Ill., a corporation of Illinois Application April 14, 1955, Serial No. 501,375

15 Claims. (Cl. 103—126)

This invention relates to a gear pump and more particularly to a gear pump of the type employing means defining pressure loaded bushings or end plates, such pumps sometimes being referred to as pressure loaded pumps.

In pressure loaded pumps of the type including means defining a set of axially movable, pressure loadable bushings or end plates, hereinafter referred to as bushings, a part of the discharge pressure generated by the pump is communicated to the rear motive pressure surfaces of the axially movable bushings to urge the bushings into sealing relationship with their associated gears. As described in United States Patent No. 2,420,622 to Lauck et al., by carefully selecting the relative areas of the forward surfaces and the rear or motive surfaces of the bushings it is possible to control within very close limits the actual sealing pressure established during operation of the pump. Gear pumps so constructed are capable of delivering fluid at an extremely high pressure with considerable volume.

In pumps of this type, it is the usual practice to provide fixed and axially movable bushings for each of the gears and machine the bushings to provide each with a flat chordal meeting or mating surface, sometimes referred to as a bearing flat, so as to provide a juncture where corresponding bushings abut one another. It is also the usual practice in pumps of this type to construct the bushings with recesses formed therein and located on the discharge side of the pump to provide for escape of fluid likely to be trapped in the pockets between the intermeshing gears adjacent the juncture of the bushings. Such escape means, known as anti-trapping grooves, have previously taken many forms. They may be in the form of round recesses, for example, as shown in the United States patent to Maisch No. 2,619,040, or rectangular recesses formed in the faces of the bushings, for example, as shown in the United States patent to Lauck et al., No. 2,527,941. It has been found that such prior art anti-trapping grooves are unsatisfactory since they do not providing for maximum relief of the fluid which may be trapped between the intermeshing gears and therefore result in a noisy operation of the pump due to severe backlash of the gear teeth caused by the trapped fluid being under higher pressure than discharge pressure. It is also the usual practice to construct the bushings with grooves therein on the inlet side of the pump, which previously have taken the form of rectangular recesses intersecting the periphery of the bushings to provide for improved filling characteristics of the pump. Such recesses leave much to be desired with regard to the filling characteristics of the pump since the sharp edges and protuberances, for example, the sharp bushing edges, impair or alter the smooth inlet flow of fluid through the inlet port to the intermeshing gears. It is therefore, the principal object of this invention to provide a pump with bushings or end plates having formed therein anti-trapping grooves and/or inlet grooves of such form or contour to overcome the difficulties encountered in the prior art pumps above mentioned.

A further object of the invention is to provide a gear pump bushing or end plate having an anti-trapping groove formed therein on the outlet side thereof which allows the maximum relief for any trapped fluid in the gear tooth spaces adjacent the full position of the gears.

A still further object of the invention is to provide a bushing or end plate for a gear pump with an inlet groove therein allowing improved inlet filling characteristics of the pump and reduces the sharp edges and protuberances of prior art forms of such grooves which impair or alter the smooth inlet flow of fluid to the pump gears.

A still further object of the invention is to provide a bushing or end plate for a gear pump having an inlet groove formed therein which assists in compensating for variations in the width of the pump chamber or by eliminating the sharp edges and protuberances of prior art forms of such grooves.

A further object of the invention is to provide a bushing or end plate for a gear pump having an inlet groove formed therein of such form or contour so as to improve the filling characteristics of the pump and to reduce the possibilities of cavitation or voids in the inlet flow of fluid to the pump.

Another object of the invention is to provide a bushing or end plate for a gear pump having an anti-trapping groove therein of such form or contour to allow trapped fluid between the intermeshing gears to be discharged from the pump through the outlet port, instead of being carried through the pump from the outlet side to the inlet side thereof under a high pressure and which overcomes other undesirable characteristics of prior art forms of such grooves.

A still further object of the invention is to provide a bushing or end plate for a gear pump having an anti-trapping groove, sometimes herein referred to as a fan or fish tail anti-trapping groove, formed therein, certain of the terminal defining surfaces of which slope at an angle with respect to the chordal juncture defining surfaces of the bushings of the driving and driven gears, respectively, toward the vertical center line of the bushing and which groove increases in area on the outlet side of the pump to direct the flow of fluid from the gear to the spaces which are decreasing in area, to the outlet port of the pump.

A further object of the invention is to provide a bushing or end plate for a gear pump having an inlet groove formed therein of the same form or contour as the anti-trapping groove described above, assisting to direct the flow of fluid on the inlet side of the pump to the gear tooth spaces.

In pressure loaded pumps herein described, each gear is provided with a pair of separate bushings and each bushing is provided with a flat chordal meeting surface, as previously described, and the pressure loadable bushings, or end plates must be able to move axially, so that a certain initial maximum clearance must be provided between the sides of the bushings and the adjacent sides of the chambers or bores in the pump housing in which the bushings are received. In practice, this clearance is actually very slight, but it has been found that, due to the rotational movement of the gears during pumping operation, each of the bushings tend to twist or rotate and follow its associated gear because of frictional torque between the gears and bushings, which twisting tends to change the center distance of the bushings, i.e., a change in the distance of the bushing twists from its original position as assembled, and/or a position at a time when the pump is not in operation. While this twisting or skewing problem is encountered in all pumps employing a pair of separate bushings for each gear, it is an extremely serious problem wherein the bushings are formed with both inlet and anti-trapping grooves in each gear engaging faces. This is so because the seal land between the grooves is relatively short, so that when the bushings become twisted or skewed, a short leakage path exists, permitting the direct bypassing of liquid from the outlet back to the inlet at the gear engaging faces of the bushings and/or at the juncture of the bushings, thereby decreasing the efficiency of the pump. By employing bushings having inlet and antitrapping grooves provided therein according to the teachings of this invention, the dimensions of the sealing lands between the grooves along the chordal juncture of the bushings is made greater, while at the same time assuring the necessary sealing areas between the land and the gear teeth radially inwardly of said chordal juncture, so that a longer leakage path across the juncture is provided thus keeping the bypassing of fluid across this path at a minimum. Therefore, it is a still further object of this invention to provide bushings or end plates for gear pumps having inlet and anti-trapping grooves therein of such a form or contour to provide a relatively long leakage path across the juncture of the bushings at the gear engaging faces and across the bearing flats resulting in an increase in the overall efficiency of the pump.

Another and important object of this invention is to provide bushings or end plates for gear pumps having fan or fish tail anti-trapping grooves and inlet grooves formed therein, said anti-trapping grooves allowing the maximum relief for the trapped fluid in the gear tooth spaces and said inlet grooves providing improved filling characteristics of the pump, while still providing a maximum seal land in the faces of the bushings at the juncture of the bushing sealing flats, so as to reduce the leakage across the face of the bushings and keeping such leakage at a minimum.

Other features and advantages of the present invention will become apparent from the following detailed description, taken in conjunction with the drawings; wherein.

Figure 2:
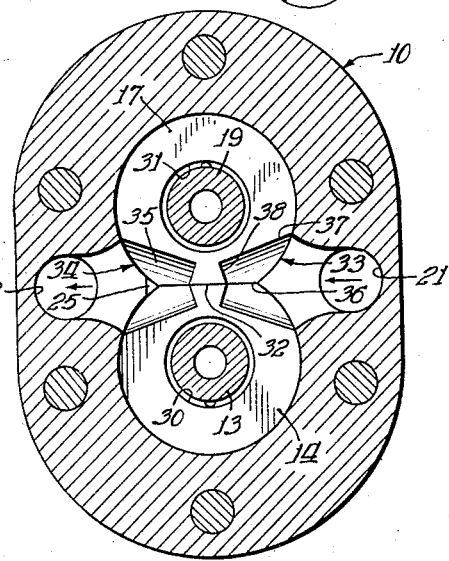
Figure 2 is a cross sectional view taken along line 2—2 of Figure 1 looking in the direction of the arrows and showing to advantage the bushings constructed in accordance with one embodiment of this invention.
Figure 3:
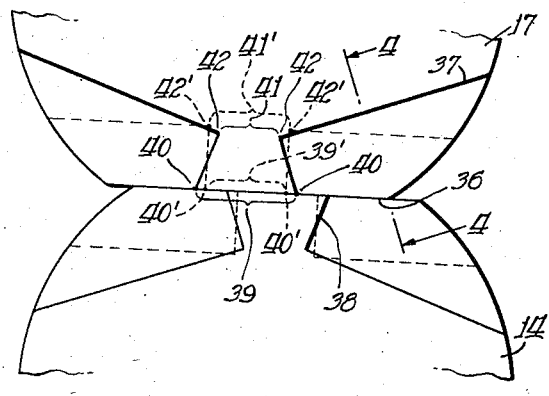
Figure 4:
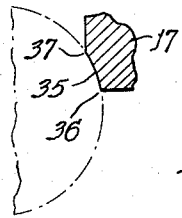

Figure 3 is a greater enlarged partial elevational view of the bushings shown in Figure 2 illustrating the bushings in twisted or skewed position and bringing out to advantage the particular shape or form of the land between the inlet anti-trapping grooves of the instant invention, and also showing in dotted lines, inlet and anti-trapping grooves of rectangular shape in order to more clearly illuminate the novel advantages of the present invention;

Figure 4 is a cross sectional view taken on line 4—4 of Figure 3 showing to advantage the form or contour of the anti-trapping grooves and inlet grooves of this invention and illustrating diagrammatically the manner in which such grooves are formed.

Figure 5:
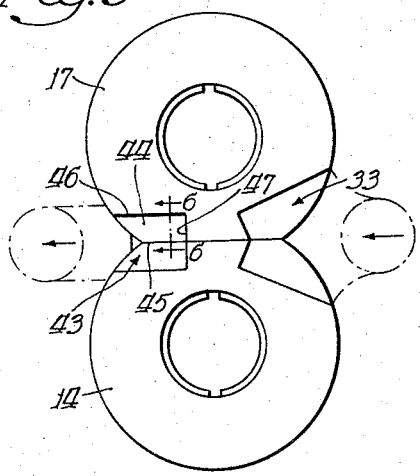
Figure 6:
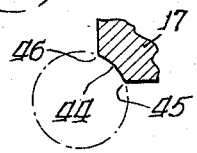

Figure 5 is a view similar to Figure 3 showing a second embodiment of this invention with the bushings in an untwisted position; and Figure 6 is a cross sectional view taken on line 6—6 of Figure 5 showing to advantage the form or contour of the anti-trapping grooves formed on the outlet side of the pump bushing in the second embodiment of this invention and illustrating diagrammatically the manner in which this groove is formed.

Figure 7:
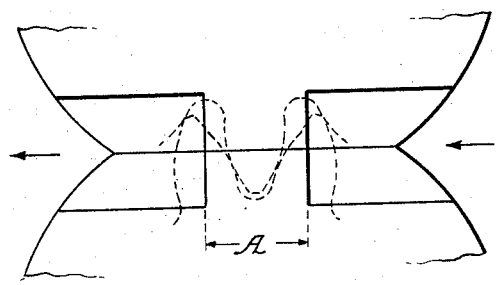
Figure 8:
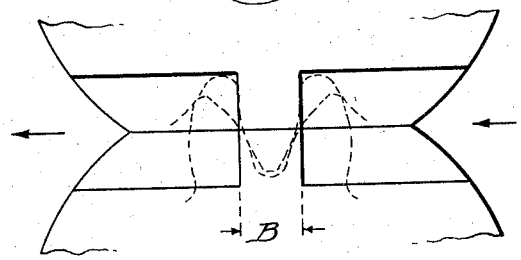
Figure 9:
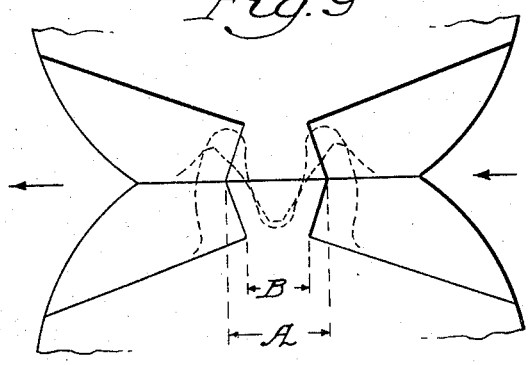

Figures 7, 8 and 9 illustrate different forms of inlet and anti-trapping grooves and together illustrate the advantages of grooves constructed in accordance with this invention, as particularly shown in Figure 9.

In the various views, the same reference character is used to refer to the same part.

Referring now to the drawing, 10 denotes a suitably chambered pump housing in which are rotatably mounted a driven gear 11 and an intermeshing driving gear 12. Driven gear 11 is supported on a shaft 13 journaled on its right end through a flanged, pressure responsive, axially movable bushing or end plate 14 and on its left side through a fixed, flanged, body bushing or end plate 15. The gear 11 and associated bushings 14 and 15 are arranged in a first chamber 16 formed in the pump housing 10 with sufficient clearance between the right end of the bushing 14 and the adjacent end wall of the housing to permit axial movement of the bushing 14. In a similar manner, driving gear 12 has disposed on its right side a flanged, pressure responsive, axially movable bushing 17 and on its left side, a fixed, flanged, body bushing 18. Driving shaft 19, upon which the gear 12 is mounted, is journalled through bushings 17 and 18 and may be suitably connected to any suitable driving means (not shown). The gear 12 and its associated bushings 17 and 18 are located in a second chamber 20 formed in the housing 10 intersecting and parallel to the chamber 16. Sufficient clearance is provided between the right end of the bushing 17 and the adjacent end wall of the housing to permit axial movement of the bushing 17.

As illustrated in Figure 2 of the drawing, the housing has an inlet port or conduit 21 formed on its right side and an outlet port or a conduit 22 formed on its left side. As illustrated in the drawing, the conduits leading to or from the pump chamber diverge to the inlet grooves or from the outlet grooves, but it is within the scope of this invention to construct these conduits so that they are of a constant diameter, if so desired. Low pressure fluid is introduced in the pump housing at the inlet 21 and high pressure fluid is discharged from the pump housing through the outlet 22, the inlet and outlet ports communicating with the inlet and discharge areas of the pump gears. The pressure loadable bushings are normally fitted into the bores with sufficient clearance to permit slight axial movement of the bushing with respect to the bores to establish the desired pressure loaded seal during operation of the pump.

In the operation of a pump of this type, discharge pressure generated by the intermeshing gears is communicated from the outlet or discharge side thereof to the annular pressure loaded areas at the back of the bushing, designated at 23 and 24 in the drawing, through an axially extending pasasge 25 formed at the peripheries of the bushings on the discharge side of the pump at the point of convergence of the bushings. Areas 23 and 24 cooperate with the adjacent walls of the housing bores 16 and 20, respectively, and with the peripheries of the bushings to define annular pressure loading chambers 26 and 27, respectively, the passage 25 extends from the discharge side of the gears to the right, as viewed in Figure 1, to the inner communicating portion of the pressure loaded chambers 26 and 27 at their point of juncture. Escape of pressure rearwardly from the pressure loading chambers is substantially prevented by means of a suitable O-ring seal (not shown) disposed about the periphery of the rear or barrel portion of each bushing in a suitable annular groove formed in the periphery of the bushing or in the adjacent bore wall. Pressure leaking past the O-ring seal may be vented to inlet pressure or to a zone of intermediate pressure in line with conventional pressure loaded pump practice, as set forth in the above-referred to Lauck et al., patent. While the bushings have been described as being flanged, it is obvious that bushings having uniform outer diameters may be employed.

To provide an initial sealing relationship between the bushings and the gear side faces, coiled compression springs 28 and 29 are disposed within the right ends of the chambers 16 and 20, respectively, so as to seat against the terminal ends of the parallel barrel or tubular portions to urge the forward surfaces of these bushings into engagement with the gear side faces.

As in the usual pressure loaded pumps constructed in accordance with the aforementioned Lauck et al., No. 2,420,622 relief recesses 30 and 31 are formed in the radially inner portions of the forward or gear engaging surfaces of the pressure loading bushings 14 and 17, or in the gear side faces, and are placed in communication with a pressure lower than discharge pressure generated by the pump through the clearance between the gear journals and the bushing bores, or by specific grooves or channels extending axially of the inner cylindrical surfaces of the tubular part or bore of the bushings. These recesses control the effective pressure area of the pressure loaded bushings, the area or size of these recesses being determined in any particular pump, so as to control the effective pressure area of the bushing in such a manner that axially forces resulting from the pressure generated by the pump acting against the gear side face engaging surfaces of the bushings 14 and 17 tend to produce axial movement of the bushing away from the gear side faces, are effectively controlled and overcome by the oppositely directed loaded forces communicated to the rear surfaces of the bushings, which latter axial forces are made to slightly exceed the first mentioned axial forces and therefore maintain proper sealing engagement.

As heretofore mentioned, it is the usual practice in pumps of this type to form anti-trapping grooves in the outlet side of the bushings in order to prevent the trapping of fluid in the pockets between the intermeshing gear teeth as they make the transition from the high pressure to the low pressure side in the area of the chordal juncture of the bushings, and to provide for escape of any fluid which might be trapped therein. Also it is the usual practice to form the bushings with inlet grooves disposed on the inlet side of the pump to provide for directing the flow of fluid from the inlet port to the intermeshing gear teeth. These grooves, both anti-trapping and inlet grooves, are generally formed in the faces of the bushings which engage the side faces of the gear teeth, and they may be formed in either the axially movable bushings or the fixed bushings or in both.

Figure 1:
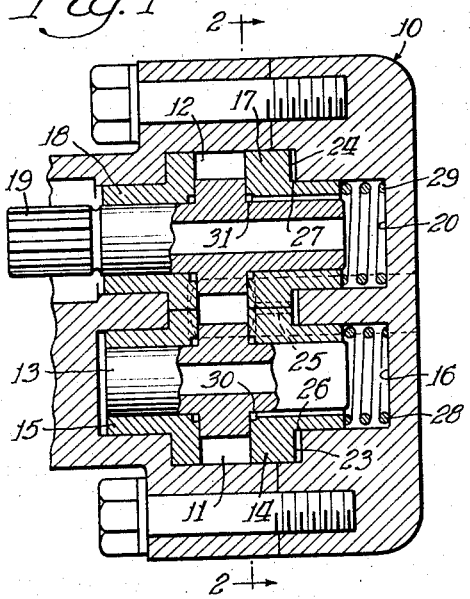
Figure 1 is a fragmentary axially sectional view of a pressure loaded intermeshing gear pump constructed in accordance with one embodiment of this invention.

In the preferred embodiment of the invention, as illustrated in Figure 2, there is shown the axially movable bushings 14 and 17, of the pump illustrated in Figure 1, each of which is formed with a chordal meeting or mating surface, so that when assembled the chordal surfaces mate to form a bushing juncture indicated at 32. Such chordal mating surfaces are also commonly known as bearing flats. The bushings are formed with inlet and anti-trapping grooves, generally indicated at 33 and 34, respectively, each groove being of a generally fan or fish tail form in plan view and having one-half of each groove formed in each bushing.

Each half of a groove is formed in the forward gear engaging face of each bushing by a cutting tool, or any other suitable means which can machine a portion of the gear engaging surface to define a curved surface. Such a tool defines a curved surface 35 (see Figure 4) which terminates at one side with line 36 formed where the curved surface meets the bearing flat or chordal surface at juncture 32 and at the other side with line or edge 37 formed where the curved surface 35 meets the forward gear engaging surface, as clearly shown in Figures 2, 3 and 5. An important feature of each half of the groove is the slope of edge or line 37 inwardly from the outer periphery of the bushing toward the bearing flat, which line 37 terminates and meets with a surface 38 perpendicular to the line 37 formed by the cutting tool in the forward face of the bushing. Surface 38 intersects the bearing flat at an angle, as shown. When the groove is thus formed in the bushing face and a similar complementary groove is formed in the corresponding bushing face, such as driving and driven gear bushings 14 and 17, an anti-trapping groove, or an inlet groove, as the case may be, is provided which opens into the inlet or the outlet and converges toward the center of the bushings; the lines 37 converging toward the bearing flats. While particular reference has been made to the bushings 14 and 17, it is to be understood that the fixed bushings 15 and 18, may be likewise formed with the corresponding inlet and anti-trapping grooves of the same shape and size as those of the bushings 14 and 17.

The shape of the grooves is such to provide a smooth flow of fluid to the gear teeth and from the gear teeth on the inlet and outlet sides of the pump, respectively.

As hereinbefore stated, since it is necessary to fit the bushings with some clearance in the bushing receiving chamber to permit slight axial movement required of the bushings in order to establish the proper seal, it has been found in practice that there is a tendency of the bushings to slightly twist or skew within the housing as a result of the frictional torque between the gear side faces or shaft of the bushing forward face and journals. This twisting or skewing may shift the bushings and cause a sliding action at the junction 32 therebetween to sufficiently establish a clearance between the chordal meeting surfaces or bearing flats of the bushings, which clearance is maintained during the operation of the pump, and may provide communication of discharge pressure from the discharge side of the gears back to the inlet side of the pump, thus materially reducing the overall efficiency of the pump. Also, when certain forms of inlet and anti-trapping grooves are formed in the gear engaging surfaces of the bushing and such twisting and skewing occurs, the gear engaging surfaces between the grooves becomes quite small, thereby reducing the seal area of the gear engaging surfaces of the bushings and the adjacent gear side faces at the juncture of the bushings, likewise materially reducing the overall efficiency of the pump, since a path of fluid flow from the high pressure to the low pressure side of the pump is provided.

The problems hereinbefore set forth will become more apparent from an inspection of Figure 3 of the drawing showing the bushings of Figure 2 incorporating inlet and anti-trapping grooves constructed in accordance with the principles of this invention, in an exaggerated twisted or skewed position and, also showing in dotted lines, for the purpose of comparison, other forms or contours of inlet and anti-trapping grooves.

It may thus be seen that when bushings are constructed with inlet and anti-trapping grooves according to the principles of this invention, the distance 39 between points 40 located at the juncture of the surfaces 38 and the bearing flats, is greater than the distance 41 between the points 42, located at the juncture of the lines 37 and the surfaces 38. In the dotted line showing on this figure, the distance 39' between the corresponding points 40', and the distance 41' between the corresponding points 42', are the same. It will therefore be obvious that when the bushings become skewed, a longer seal area is provided at the bearing flats between the grooves constructed in accordance with the principles of this invention than that provided when grooved, such as shown in dotted lines are employed, and therefore, less leakage will occur along the bearing flats because of this greater seal area. Also, the grooves constructed in accordance with this invention result in a greater bearing face area in sealing contact with the adjacent gear side faces at the critical point or full meshing position of the gears, thereby resulting in a longer leakage path from the outlet to the inlet side of the pump along the gear engaging faces of the bushings than in the dotted line type of grooves. The form of the grooves of this invention, while providing the longer sealing and leakage paths, still provide for maximum escape of trapped fluid and improved filling characteristics of the pump.

To further illustrate the advantages of the inlet and anti-trapping grooves constructed in accordance with the teachings of this invention, attention is directed to Figures 7, 8 and 9.

Figure 7 illustrates such grooves wherein there is provided a good sealing land at the critical point of full meshing of the gears and across the bushing juncture, but because of the distance A between the inner extremities of the grooves inlet and relief of trapped fluid characteristics, or volumetric characteristics, leave much to be desired since the inlet groove does not extend to a position to completely fill all spaces between the teeth, and on the outlet side, no communication with the outlet is provided for all spaces between the teeth.

Figure 8 illustrates inlet and anti-trapping grooves spaced by a distance B, shorter than A in Figure 7. The placement of the grooves leaves much to be desired with regard to the sealing land at the critical point of meshing of the gears and across the bushing juncture but the volumetric considerations are much improved over the grooves shown in Figure 7, since inlet flow will fill all spaces between the teeth, and, on the outlet side, more spaces communicate with the outlet so that fluid trapped therein may be discharged.

Figure 9 illustrates the inlet and anti-trapping grooves of the instant invention, and as may be seen, the sealing land at the critical point is the same as that illustrated in Figure 7, that is, the spacing at the juncture of the bushings is the distance A. Also, the inner extent of the grooves is the same as that illustrated in Figure 8, that is, they are spaced a distance B. It is thus obvious that the grooves constructed in accordance with the teachings of this invention combine the desirable qualities of Figures 7 and 8, without their undesirable qualities.

In some pumps, however, there is little difficulty in discharging fluid trapped between the gears adjacent the outlet side of the pump, and rectangular trapping grooves intersecting the periphery of the bushings perform in a satisfactory manner, but difficulty has been experienced in providing a smooth flow of fluid to the gears on the inlet side of the pump, so as to improve the filling characteristics of the pump.

Figure 5 shows another embodiment of the invention wherein the bushings 14 and 17 are provided with an inlet groove, generally indicated at 33, of the same form or contour as the grooves illustrated in the Figure 2 embodiment, so that the description of the grooves in the Figure 2 embodiment will suffice. The anti-trapping grooves in this embodiment, generally indicated at 43, are substantially rectangular in shape and intersect the peripheries of the bushings. The groove in each bushing is formed in the forward gear engaging face thereof by a cutting tool or other suitable means, which can machine a portion of the gear engaging surface to define a curved surface. Such a tool defines a curved surface 44 (see Figure 6) which terminates at one side with line 45 where the curved surface meets the bearing flat and at the other side with line 46 formed where the curved surface 44 meets the forward gear engaging surface, as clearly shown in Figure 5. The groove terminates in a surface 47 perpendicular to the groove 44 and the lines 45 and 46. Bushings so constructed, provide a long leakage path at the bushing juncture and also along the gear engaging surface thereof, so as to improve the overall efficiency of the pump. As in the case of the Figure 2 embodiment, it is to be understood that the axially movable or the fixed bushings or both the axially movable and fixed bushings may be provided with such grooves.

Where herein the various parts of the invention have been referred to as located in the right or left positions, it will be understood that this is done solely for the purpose of facilitating description and that such references relate only to the relative portion of the parts as shown in the accompanying drawings.

While particular grooves have been described as being formed in bushings having flat chordal meeting surfaces or bearing flats, it is to be expressly understood that the anti-trapping grooves and inlet grooves of the instant invention are equally adaptable for use in pumps incorporating only one fixed and only one axially movable bushing. In such pumps, of course, the grooves would then be formed by using a more complex cutting tool.

For the purpose of description, reference has been specifically made to pumps referred to as pressure loaded pumps. However, the anti-trapping grooves and the inlet grooves, as described, are equally applicable to fixed bushing pumps and also such grooves could be formed in the housing walls of pumps wherein the housing walls form the pump bushings.

While certain preferred embodiments of the invention have been specifically disclosed, it is understood that the invention is not limited thereto, as many variations will be radially apparent to those skilled in the art and the invention is to be given its broadest possible interpretation within the terms of the following claims:

I claim:

1. In an intermeshing gear type pump, end plate defining means having surface means engaging the side faces of the gears in fluid sealing relation, an inlet to and an outlet from said pump, and means defining a groove in said surface means of said end plate defining means, said groove defining a pair of edges with said surface means, each of said edges extending from a position on the outlet side of the gear teeth diverging from each other and being oppositely spaced from and diverging from a common tangent to the pitch line circles of said gears to the outlet side periphery of said end plate defining means whereby said groove is in communication with said outlet and said groove having an inner closed terminal wall means on the outlet side of said end plate defining means spaced from and angular to a plane passing through the axes of rotation of said gears, said terminal wall means having portions thereof joining said edges perpendicularly, said means defining said groove being effective to allow fluid present between successive pairs of teeth as they approach full meshing relation to escape around the terminal edges of said teeth and to said outlet.

2. In an intermeshing gear type pump, end plate defining means radially co-extensive with the gear teeth and having surface means engaging the gear side faces on at least one side thereof in fluid sealing relation, an inlet to and an outlet from said pump, and means defining a groove in the sealing surface of at least one of said end plate defining means, said groove defining a pair of edges with said surface, each of said edges extending from a position on the outlet side of the gear teeth diverging from each other and being oppositely spaced from and diverging from a common tangent to the pitch line circles of said gears to the outlet side periphery of said end plate defining means whereby said groove is in communication with said outlet and said groove having an inner closed terminal wall means on the outlet side of said end plate defining means spaced from and angular to a plane passing through the axes of rotation of said gears, said terminal wall means having portions thereof joining said edges perpendicularly to assure the provision of a sealing surface on said end plate defining means opposite and closely adjacent the full meshing position of said gears, said means defining said groove being effective to allow fluid present between successive pairs of teeth as they approach full meshing relation to escape around the terminal edges of said teeth and to said outlet.

3. In a pressure loaded intermeshing gear type pump, bushings having sealing surfaces engaging the gear side faces in fluid sealing relation one of which is fixed and another of which is axially movable, means to pressure load said axially movable bushing so as to insure said sealing relation, an inlet to and an outlet from said pump, means defining flat chordal surfaces on said bushings, and means defining a groove in the sealing surface of at least one of said bushings, said groove defining an edge with said sealing surface, said edge extending from a position on the outlet side of the gear teeth and being spaced from and diverging from said flat chordal surface to the outlet side periphery of said bushing whereby said groove is in communication with said outlet and said groove having an inner closed terminal wall on the outlet side of said bushing spaced from and angular to a plane passing through the axes of rotation of said gears, said terminal wall joining said flat chordal surface angularly whereby said terminal wall is spaced farthest from said plane at said juncture to assure the provision of a sealing surface on said bushing opposite and closely adjacent the full meshing position of said gears, said means defining said groove being effective to allow fluid present between successive pairs of teeth as they approach full meshing relation to escape around the terminal edges of said teeth and to said outlet.

4. In a pressure loaded intermeshing gear type pump, bushings radially co-extensive with and having sealing surfaces engaging the gear side faces in fluid sealing relation one pair of which is fixed and another pair of which is axially movable and each of which is formed with a flat chordal meeting surface thus forming a juncture between each pair and being subject to misalignment by the action of the gears thereon, means to pressure load said axially movable bushings so as to insure said sealing relation thereof, an inlet to and an outlet from said pump, and means defining a groove in the sealing surfaces of at least one pair of bushings, said last-named means being partially defined in each bushing of said pair and joining at said juncture, said groove defining an edge with the sealing surface of each bushing, said edges extending from a position on the outlet side of the gear teeth diverging from each other and being spaced from and diverging from a common tangent to the pitch line circles of said gears to the outlet side periphery of said bushings whereby said groove is in communication with said outlet, and said groove being further defined by an inner closed terminal wall on the outlet sides of each bushing, each said terminal wall angularly intersecting at said juncture and being spaced from and angular to a plane passing through the axes of rotation of said gears, said terminal walls being spaced farthest from said plane at said juncture to assure the provision of sealing surfaces on said bushings opposite and closely adjacent the full meshing position of said gears even when misalignment of said bushings occurs, said last-named means being effective to allow fluid trapped between successive pairs of teeth as they approach full meshing relation to escape around the terminal edges of said teeth and to said outlet.

5. In an intermeshing gear type pump, end plate defining means having surface means engaging the side faces of said gears in fluid sealing relation, an inlet to and an outlet from said pump, and means defining a groove in said surface means of said end plate defining means, said groove defining a pair of edges with said surface means, each of said edges extending from a position on the inlet side of the gear teeth diverging from each other and being oppositely spaced from and diverging from a common tangent to the pitch line circles of said gears to the inlet side periphery of said end plate defining means whereby said groove is in communication with said inlet and said groove having an inner closed terminal wall means on the inlet side of said end plate defining wall means spaced from and angular to a plane passing through the axes of rotation of said gears, said terminal wall means having portions thereof joining said edges perpendicularly, said means defining said groove providing a smooth entry of fluid to said teeth on the inlet side of the pump for the filling thereof.

6. In a pressure loaded intermeshing gear type pump, bushings having sealing surfaces engaging the gear side faces in fluid sealing relation one of which is fixed and another of which is axially movable, means to pressure load said axially movable bushing so as to insure said sealing relation, an inlet to and an outlet from said pump, means defining flat chordal surfaces on said bushings and means defining a groove in said sealing surface of at least one of said bushings, said groove defining an edge with said sealing surface, said edge extending from a position on the inlet side of the gear teeth and being spaced from and diverging from said flat chordal surface to the inlet side periphery of said bushing whereby said groove is in communication with said inlet and said groove having an inner closed terminal wall on the inlet side of said bushing spaced from and angular to a plane passing through the axes of rotation of said gears, said terminal wall joining said flat chordal surface angularly whereby said terminal wall is spaced farthest from said plane at said juncture to assure the provision of a sealing surface on said bushings opposite and closely adjacent the full meshing position of said gears, said means defining said groove providing a smooth entry of fluid to said teeth on the inlet side of the pump for the filling thereof.

7. In a pressure loaded intermeshing gear type pump, bushings radially co-extensive with and having sealing surfaces engaging the gear side faces in fluid sealing relation one pair of which is fixed and another pair of which is axially movable and each of which is formed with a flat chordal meeting surface thus forming a juncture between each pair and being subject to misalignment by the action of the gears thereon, means to pressure load said axially movable bushings so as to insure said sealing relation thereof, an inlet to and an outlet from said pump, and means defining a groove in the sealing surfaces of at least one pair of bushings, said last-named means being partially defined in each bushing of said pair and joining at said juncture, said groove defining an edge with the sealing surface of each bushing, said edges extending from a position on the inlet side of the gear teeth diverging from each other and being spaced from and diverging from a common tangent to the pitch line circles of said gears to the inlet side periphery of said bushings whereby said groove is in communication with said inlet, and said groove being further defined by inner closed terminal walls on the inlet side of said bushings, said terminal walls intersecting at an angle at said juncture and being spaced from and angular to a plane passing through the axes of rotation of said gears, said terminal walls being spaced farthest from said plane at said juncture to insure the provision of sealing surfaces on said bushings opposite and closely adjacent the full meshing position of said gears even when misalignment of said bushings occurs, said last-named means providing a smooth entry of fluid to said teeth on the inlet side of the pump for the filling thereof.

8. In an intermeshing gear type pump, end plate defining means having sealing surface means engaging the side faces of the gears in fluid sealing relation, an inlet to and an outlet from said pump, means defining a first groove in said sealing surface means of said end plate defining means, said first groove defining a first pair of edges with said sealing surface means, said edges extending from a position on the inlet side of the gear teeth diverging from each other and being oppositely spaced from and diverging from a common tangent to the pitch line circles of said gears to the inlet side periphery of said end plate defining means whereby said first groove is in communication with said inlet and said first groove having an inner closed terminal wall means on the inlet side of said end plate defining means spaced from and angular to a plane passing through the axes of rotation of said gears, said terminal wall means having portions thereof joining said edges perpendicularly and means defining a second groove in said sealing surface means of said end plate defining means extending from a position on the outlet side of the gear teeth to the outlet side periphery of said end plate defining means whereby said second groove is in communication with said outlet and said second groove having an inner closed terminal wall means on the outlet side of said end plate defining means spaced from said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet.

9. In an intermeshing gear type pump, end plate defining means having surface means engaging the side faces of the gears in fluid sealing relation, an inlet to and an outlet from said pump, means defining a first groove in said surface means of said end plate defining means, said first groove defining a pair of edges with said surface means, each of said edges extending from a position on the inlet side of the gear teeth diverging from each other and being oppositely spaced from and diverging from a common tangent to the pitch line circles of said gears to the inlet side periphery of said end plate defining means whereby said groove is in communication with said inlet and said groove having an inner closed terminal wall means on the inlet side of said end plate defining means spaced from and angular to a plane passing through the axes of rotation of said gears, said terminal wall means having portions thereof joining said edges perpendicularly, and means defining a second groove in said sealing surface means of said end plate defining means extending from a position on the outlet side of the gear teeth substantially parallel to said common tangent to the outlet side periphery of said end plate defining means whereby said second groove is in communication with said outlet and said second groove having an inner closed terminal wall means on the outlet side of said end plate defining means spaced from and substantially parallel to said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet.

10. In an intermeshing gear type pump, end plate defining means having sealing surface means engaging the side faces of the gears in fluid sealing relation, an inlet to and an outlet from said pump, means defining a first groove in said sealing surface means of said end plate defining means, said first groove defining a first pair of edges with said sealing surface means, said edges extending from a position on the inlet side of the gear teeth diverging from each other and being oppositely spaced from and diverging from a common tangent to the pitch line circles of said gears to the inlet side periphery of said end plate defining means whereby said first groove is in communication with said inlet and said first groove having an inner closed terminal wall means on the inlet side of said end plate defining means spaced from and angular to a plane passing through the axes of rotation of said gears, said terminal wall means having portions thereof joining said edges perpendicularly, and means defining a second groove in said sealing surface means of said end plate defining means, said second groove defining a second pair of edges with said sealing surface means, said edges of said second pair of edges extending from a position on the outlet side of the gear teeth diverging from each other and being oppositely spaced from and diverging from said common tangent to the outlet side periphery of said end plate defining means whereby said second groove is in communication with said outlet and said second groove having an inner closed terminal wall means on the outlet side of said end plate defining means spaced from and angular to said plane, said terminal wall means of said second groove having portions thereof joining said edges of said second pair perpendicularly, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet.

11. In an intermeshing gear type pump, end plate defining means radially co-extensive with the gear teeth and having sealing surface means engaging the gear side faces on at least one side thereof in fluid sealing relation, an inlet to and an outlet from said pump, means defining a first groove in said sealing surface means of said end plate defining means, said first groove defining a first pair of edges with said sealing surface means, said edges extending from a position on the inlet side of the gears diverging from each other and being oppositely spaced from and diverging from a common tangent to the pitch line circles of said gears to the inlet side periphery of said end plate defining means whereby said first groove is in communication with said inlet and said first groove having an inner closed terminal wall means on the inlet side of said end plate defining means spaced from and angular to a plane passing through the axes of rotation of said gears, said terminal wall means having portions thereof joining said edges perpendicularly, and means defining a second groove in said sealing surface means of said end plate defining means, said second groove defining a second pair of edges with said sealing surface means, said edges of said second pair extending from a position on the outlet side of the gear teeth to the outlet side periphery of said end plate defining means whereby said second groove is in communication with said outlet and said second groove having an inner closed terminal wall means on the outlet side of said end plate defining means spaced from said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet, said inner terminal wall means of said means defining said grooves being spaced on opposite sides of said plane to assure the provision of sealing surfaces on said end plate defining means opposite and closely adjacent the full meshing position of said gears.

12. In an intermeshing gear type pump, end plate defining means radially co-extensive with the gear teeth and have sealing surface means engaging the gear side faces on at least one side thereof in fluid sealing relation, an inlet to and an outlet from said pump, means defining a first groove in said sealing surface means of said end plate defining means, said first groove defining a first pair of edges with said sealing surface means, said edges extending from a position on the inlet side of the gears diverging from each other and being oppositely spaced from and diverging from a common tangent to the pitch line circles of said gears to the inlet side periphery of said end plate defining means whereby said first groove is in communication with said inlet and said first groove having an inner closed terminal wall means on the inlet side of said end plate defining means spaced from and angular to a plane passing through the axes of rotation of said gears, said terminal wall means having portions thereof joining said edges perpendicularly, and means defining a second groove in said sealing surface means of said end plate defining means, said second groove defining a second pair of edges with said sealing surface means, said edges of said second pair extending from a position on the outlet side of the gear teeth substantially parallel to said common tangent to the outlet side periphery of said end plate defining means whereby said second groove is in communication with said outlet and said second groove having an inner closed terminal wall means on the outlet side of said end plate defining means spaced from and substantially parallel to said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet, said inner terminal wall means of said means defining said grooves being spaced on opposite sides of said plane to assure the provision of sealing surfaces on said end plate defining means opposite and closely adjacent the full meshing position of said gears.

13. In an intermeshing gear type pump, end plate defining means radially co-extensive with the gear teeth and having sealing surface means engaging the gear side faces on at least one side thereof in fluid sealing relation, an inlet to and an outlet from said pump, means defining a first groove in said sealing surface means of said end plate defining means, said first groove defining a first pair of edges with said sealing surface means, said edges extending from a position on the inlet side of the gears diverging from each other and being oppositely spaced from and diverging from a common tangent to the pitch line circles of said gears to the inlet side periphery of said end plate defining means whereby said first groove is in communication with said inlet and said first groove having an inner closed terminal wall means on the inlet side of said end plate defining means spaced from and angular to a plane passing through the axes of rotation of said gears, said terminal wall means having portions thereof joining said edges perpendicularly, and means defining a second groove in said sealing surface means of said end plate defining means, said second groove defining a second pair of edges with said sealing surface means, said edges of said second pair extending from a position on the outlet side of the gear teeth diverging from each other and being oppositely spaced from and diverging from said common tangent to the outlet side periphery of said end plate defining means whereby said second groove is in communication with said outlet and said second groove having an inner closed terminal wall means on the outlet side of said end plate defining means spaced from and angular to said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet, said inner terminal wall means of said means defining said grooves being spaced on opposite sides of said plane to assure the provision of sealing surfaces on said end plate defining means opposite and closely adjacent the full meshing position of said gears.

14. In a pressure loaded intermeshing gear type pump, bushings radially co-extensive with and having sealing surface means engaging the gear side faces in fluid sealing relation one pair of which is fixed and another pair of which is axially movable and each of which is formed with a flat chordal meeting surface thus forming a juncture between each pair and being subject to misalignment by the action of the gears thereon, means to pressure load said axially movable bushings so as to insure said sealing relation, an inlet to and an outlet from said pump, means defining a first groove in the sealing surfaces of at least one pair of bushings, said first groove defining an edge with the surface of each of said bushings, said edges extending from a position on the inlet side of the gear teeth diverging from each other and being spaced from and diverging from a common tangent to the pitch line circles of said gears to the inlet side periphery of said bushings whereby said first groove is in communication with said inlet, said last-named means being partially defined in each bushing of said pair and joining at said juncture and each portion being further defined by an inner closed terminal wall on the inlet side of said bushings, each said terminal wall angularly intersecting at said juncture and being spaced from and angular to a plane passing through the axes of rotation of said gears, said terminal walls being spaced farthest from said plane at said juncture, and means defining a second groove in said sealing surfaces of at least one pair of bushings extending from a position on the outlet side of the gear teeth to the outlet side periphery of said bushings whereby said second groove is in communication with said outlet, said means defining said second groove being partially defined in each bushing of said pair and joining at said juncture and being further defined by an inner closed terminal wall on the outlet side of said bushings spaced from said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet, said inner terminal walls of said means defining said grooves being spaced on opposite sides of said plane to assure the provision of sealing surfaces on said bushings opposite and closely adjacent the full meshing position of said gears even when misalignment of said bushings occurs.

15. In a pressure loaded intermeshing gear type pump, bushings radially co-extensive with and having sealing surface means engaging the gear side faces in fluid sealing relation one pair of which is fixed and another pair of which is axially movable and each of which is formed with a flat chordal meeting surface thus forming a juncture between each pair and being subject to misalignment by the action of the gears thereon, means to pressure load said axially movable bushings so as to insure said sealing relation, an inlet to and an outlet from said pump, means defining a first groove in the sealing surfaces of at least one pair of bushings, said first groove defining an edge with the sealing surface of each of said bushings, said edges extending from a position on the inlet side of the gear teeth diverging from each other and being spaced from and diverging from a common tangent to the pitch line circles of said gears to the inlet side periphery of said bushings whereby said first groove is in communication with said inlet, said last-named means being partially defined in each bushing of said pair and joining at said juncture and each portion being further defined by an inner closed terminal wall on the inlet side of said bushings, each said terminal wall angularly intersecting at said juncture and being spaced from and angular to a plane passing through the axes of rotation of said gears, said terminal walls being spaced farthest from said plane at said juncture, and means defining a second groove in said sealing surfaces of at least one pair of bushings extending from a position on the outlet side of the gear teeth substantially parallel to said common tangent to the outlet side periphery of said bushings whereby said second groove is in communication with said outlet, said means defining said second groove being partially defined in each bushing of said pair and joining at said juncture and being further defined by an inner closed terminal wall on the outlet side of said bushings spaced from and substantially parallel to said plane, said means defining said first groove providing a smooth entry of fluid to said teeth on the inlet side of the pump for the filling thereof and said means defining said second groove being effective to allow fluid present between successive pairs of teeth as they approach full meshing relation to escape around the terminal edges of said teeth and to said outlet, said inner terminal walls of said means defining said grooves being spaced in opposite sides of said plane to assure the provision of sealing surfaces on said bushings opposite and closely adjacent the full meshing position of said gears even when misalignment of said bushings occurs.

References Cited in the file of this patent

UNITED STATES PATENTS

| | | |
|---|---|---|
| 1,129,091 | Hawley | Feb. 23, 1915 |
| 1,673,259 | Meston et al. | June 12, 1928 |
| 1,769,153 | Meyer | July 1, 1930 |
| 1,976,227 | Howard | Oct. 9, 1934 |
| 2,051,301 | Kleckner et al. | Aug. 18, 1936 |
| 2,310,078 | Herman | Feb. 2, 1943 |
| 2,349,022 | Ungar et al. | May 16, 1944 |
| 2,354,992 | Gottlieb | Aug. 1, 1944 |
| 2,362,106 | Ungar et al. | Nov. 7, 1944 |
| 2,395,824 | Herman | Mar. 5, 1946 |
| 2,420,622 | Roth et al. | May 13, 1947 |
| 2,438,957 | Wunsch et al. | Apr. 6, 1948 |
| 2,498,790 | Caughrean | Feb. 28, 1950 |
| 2,540,235 | Berkley | Feb. 6, 1951 |
| 2,624,287 | Ilyin | Jan. 6, 1953 |
| 2,707,441 | Drennen | May 3, 1955 |
| 2,735,372 | Booth et al. | Feb. 21, 1956 |
| 2,746,394 | Dolza et al. | May 22, 1956 |
| 2,781,730 | Newmier | Feb. 19, 1957 |